(12) United States Patent
Zhang et al.

(10) Patent No.: US 12,149,969 B2
(45) Date of Patent: Nov. 19, 2024

(54) METHOD FOR CSI AND BEAM REPORT ENHANCEMENT FOR MULTI-TRP FULL DUPLEX

(71) Applicant: APPLE INC., Cupertino, CA (US)

(72) Inventors: Yushu Zhang, Beijing (CN); Chunhai Yao, Beijing (CN); Chunxuan Ye, San Diego, CA (US); Dawei Zhang, Cupertino, CA (US); Haitong Sun, Cupertino, CA (US); Hong He, Cupertino, CA (US); Huaning Niu, Cupertino, CA (US); Oghenekome Oteri, San Diego, CA (US); Seyed Ali Akbar Fakoorian, San Diego, CA (US); Sigen Ye, San Diego, CA (US); Wei Zeng, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 17/593,367

(22) PCT Filed: Jul. 1, 2021

(86) PCT No.: PCT/CN2021/103998
§ 371 (c)(1),
(2) Date: Sep. 16, 2021

(87) PCT Pub. No.: WO2023/272681
PCT Pub. Date: Jan. 5, 2023

(65) Prior Publication Data
US 2024/0015537 A1    Jan. 11, 2024

(51) Int. Cl.
*H04W 24/08* (2009.01)
*H04B 7/06* (2006.01)
(Continued)

(52) U.S. Cl.
CPC .......... *H04W 24/08* (2013.01); *H04B 7/0626* (2013.01); *H04B 17/345* (2015.01); *H04L 5/0035* (2013.01); *H04L 5/0051* (2013.01)

(58) Field of Classification Search
CPC ... H04W 4/00; H04W 72/04; H04W 72/0453; H04L 1/00; H04L 5/00; H04L 1/0025; H04L 1/0018; H04L 5/14; H04B 7/06
See application file for complete search history.

(56) References Cited

U.S. PATENT DOCUMENTS

2020/0106593 A1* 4/2020 Wu .................. H04L 5/0048
2022/0386156 A1* 12/2022 Park .................. H04W 24/10
2023/0421316 A1* 12/2023 Laddu .................. H04B 7/024

FOREIGN PATENT DOCUMENTS

CN       108810932 A      11/2018
WO    2018128297 A1       7/2018
(Continued)

OTHER PUBLICATIONS

PCT/CN2021/103998, International Search Report and Written Opinion, Mar. 29, 2022, 9 pages.
(Continued)

*Primary Examiner* — Iqbal Zaidi
(74) *Attorney, Agent, or Firm* — Dorsey & Whitney LLP

(57) ABSTRACT

Interference measurement may include decoding a channel state information (CSI) reporting configuration received from a base station. The CSI reporting configuration may be associated with a set of resources for interference measurement. The first UE may be in communication with at least a first transmission and reception point (TRP) of a plurality of TRPs and at least a second TRP of the plurality of TRPs may also be in communication with a second UE that creates cross-link interference for the first UE. At the first UE, a cross-link interference measurement associated with the
(Continued)

second UE may be performed using the CSI reporting configuration.

17 Claims, 6 Drawing Sheets

(51) Int. Cl.
  *H04B 17/345* (2015.01)
  *H04L 5/00* (2006.01)

(56) References Cited

FOREIGN PATENT DOCUMENTS

| WO | 2020143027 A1 | 7/2020 |
| WO | 2021071337 A1 | 4/2021 |

OTHER PUBLICATIONS

Spreadtrum Communications, "Discussion on CSI enhancement for multiple TRP/Panel transmission", R1-2006262, 3GPP TSG RAN WG#1 102-e, Aug. 28, 2020.

* cited by examiner

METHOD FOR CSI AND BEAM REPORT ENHANCEMENT FOR MULTI-TRP FULL DUPLEX

TECHNICAL FIELD

This application relates generally to wireless communication systems, including measuring cross-link interference at a UE experiencing such interference.

BACKGROUND

Wireless mobile communication technology uses various standards and protocols to transmit data between a base station and a wireless communication device. Wireless communication system standards and protocols can include, for example, 3rd Generation Partnership Project (3GPP) long term evolution (LTE) (e.g., 4G), 3GPP new radio (NR) (e.g., 5G), and IEEE 802.11 standard for wireless local area networks (WLAN) (commonly known to industry groups as Wi-Fi®).

As contemplated by the 3GPP, different wireless communication systems standards and protocols can use various radio access networks (RANs) for communicating between a base station of the RAN (which may also sometimes be referred to generally as a RAN node, a network node, or simply a node) and a wireless communication device known as a user equipment (UE). 3GPP RANs can include, for example, global system for mobile communications (GSM), enhanced data rates for GSM evolution (EDGE) RAN (GERAN), Universal Terrestrial Radio Access Network (UTRAN), Evolved Universal Terrestrial Radio Access Network (E-UTRAN), and/or Next-Generation Radio Access Network (NG-RAN).

Each RAN may use one or more radio access technologies (RATs) to perform communication between the base station and the UE. For example, the GERAN implements GSM and/or EDGE RAT, the UTRAN implements universal mobile telecommunication system (UMTS) RAT or other 3GPP RAT, the E-UTRAN implements LTE RAT (sometimes simply referred to as LTE), and NG-RAN implements NR RAT (sometimes referred to herein as 5G RAT, 5G NR RAT, or simply NR). In certain deployments, the E-UTRAN may also implement NR RAT. In certain deployments, NG-RAN may also implement LTE RAT.

A base station used by a RAN may correspond to that RAN. One example of an E-UTRAN base station is an Evolved Universal Terrestrial Radio Access Network (E-UTRAN) Node B (also commonly denoted as evolved Node B, enhanced Node B, eNodeB, or eNB). One example of an NG-RAN base station is a next generation Node B (also sometimes referred to as a or g Node B or gNB).

A RAN provides its communication services with external entities through its connection to a core network (CN). For example, E-UTRAN may utilize an Evolved Packet Core (EPC), while NG-RAN may utilize a 5G Core Network (5GC).

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Various embodiments are described with regard to a UE. However, reference to a UE is merely provided for illustrative purposes. The example embodiments may be utilized with any electronic component that may establish a connection to a network and is configured with the hardware, software, and/or firmware to exchange information and data with the network. Therefore, the UE as described herein is used to represent any appropriate electronic component.

Currently, 5G standards support multi-transmission/reception point (multi-TRP)/multi-panel operation (i.e., a gNB communicating with a UE from multiple TRPs or multiple panels). In particular, current multi-TRP/multi-panel operation may support: 1. Multiple TRPs (e.g., two) being from the same cell or different cells; 2. Both ideal-backhaul and non-ideal backhaul; 3. Multiple TRPs transmitting the same signals (i.e., for reliability enhancement) or different signals (i.e., for throughput enhancement) to a UE; 4. A UE transmitting the same signals to different TRPs in a time domain division (TDM) manner for reliability enhancement; and 5. Configuring the slot format in a broadcast or group-cast level, including: a. For a UE, an uplink (UL)/downlink (DL) slot may be the same for all the TRPs in a multi-TRP operation.

In 3GPP Release 18 (Rel-18), a full duplex based multi-TRP/multi-panel operation may be introduced, including: 1. A different slot format for different TRPs/panels; 2. For a UE operating downlink reception in a slot, the UE may receive interference from another UE; and 3. For a UE operating uplink transmission in a slot, the TRP/panel may receive interference from another UE.

Figure 1:
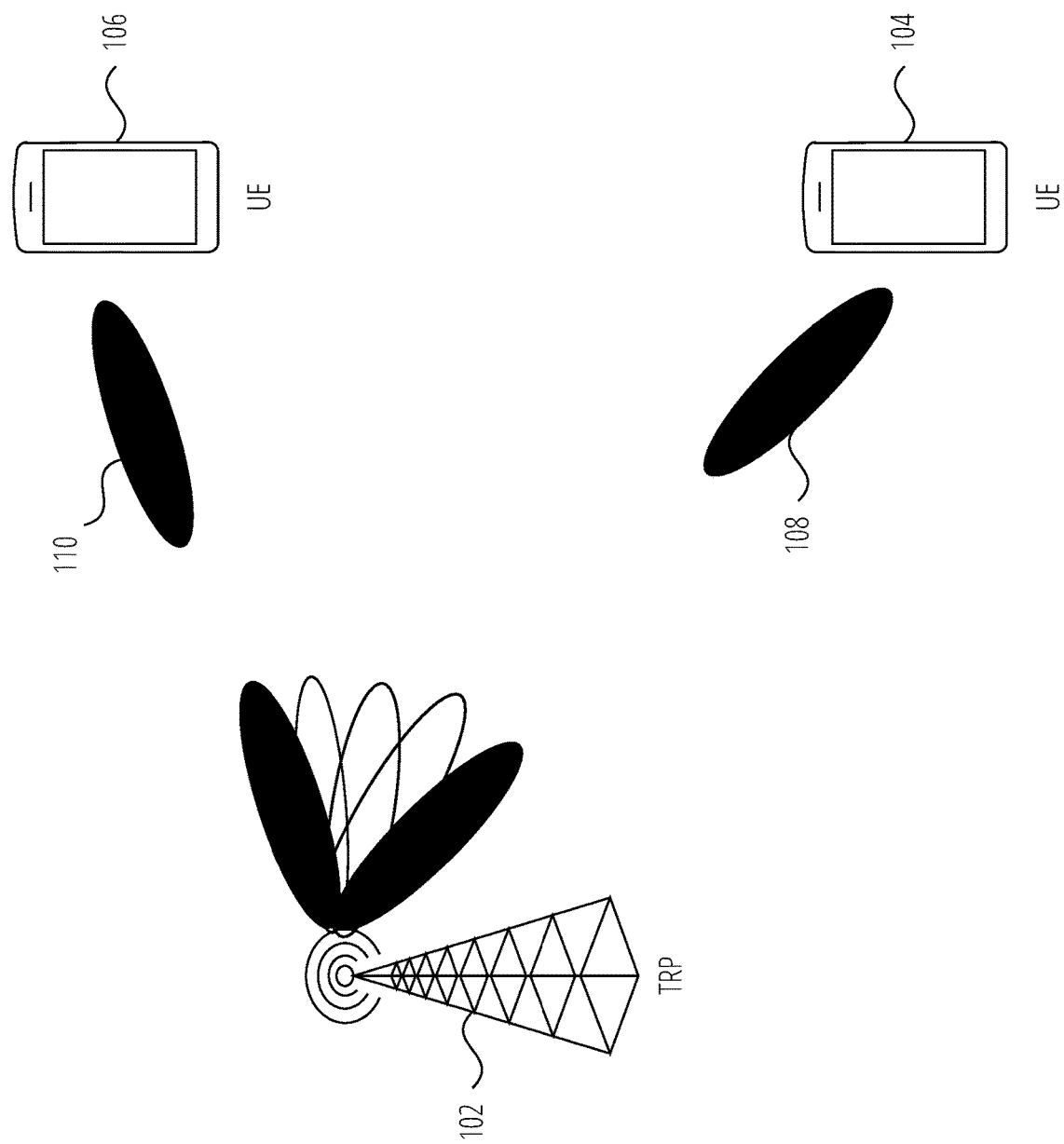
FIG. 1 illustrates an example wireless environment that may introduce cross-link interference in accordance with one embodiment.

FIG. 1 illustrates an example wireless environment that may introduce cross-link interference. As illustrated, FIG. 1 includes a TRP 102, a victim UE 104 receiving a downlink transmission (panel 1) 108, and an interfering UE 106 sending an uplink transmission (panel 2) 110. In particular, the downlink transmission (panel 1) 108 and the uplink transmission (panel 2) 110 may be transmitted using TDM. In such scenarios, the UE 106 (i.e., the interference UE) may create cross-link interference for the UE 104 (i.e., the victim UE).

Figure 2:
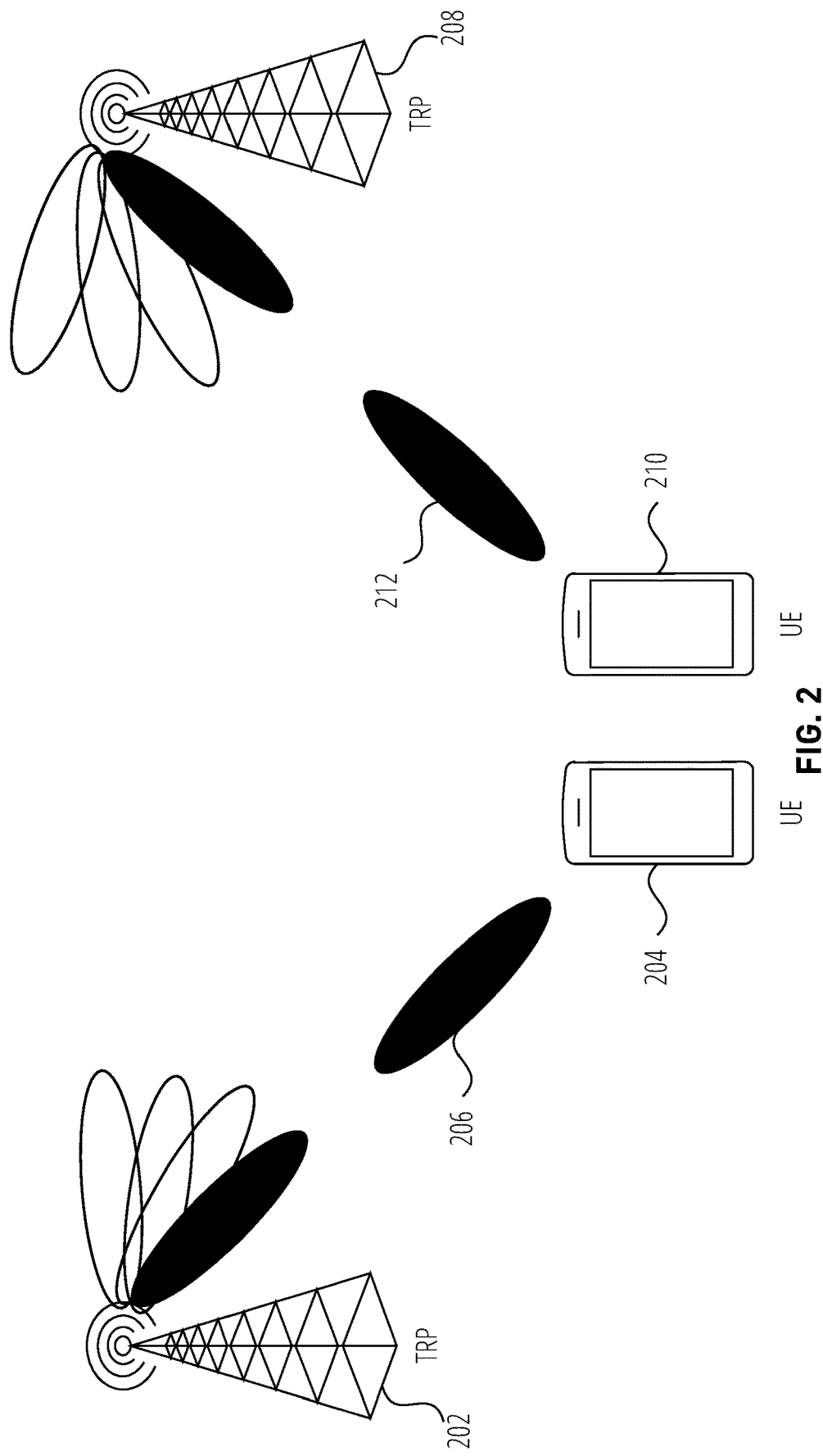
FIG. 2 illustrates an example wireless environment that may introduce cross-link interference in accordance with one embodiment.

FIG. 2 illustrates another example environment that may introduce interference. As illustrated, FIG. 2 includes a TRP 202 sending a downlink transmission 206 to a victim UE 204 and an interfering UE 210 sending an uplink transmission 212 to a TRP 208. In particular, the downlink transmission 206 and the uplink transmission 212 may be transmitted using TDM. In such scenarios, cross-link interference associated with the UEs (and inter-cell interference for the TRPs) may be created.

Accordingly, the principles described herein include solutions associated with channel state information (CSI) and beam measurement enhancement for multi-TRP/multi-panel based full duplex with regard to cross-link interference, including: 1. An interference measurement operation for CSI; 2. An interference measurement operation for Layer 1-signal-to-noise and interference ratio (L1-SINR); and 3. A sounding reference signal (SRS) enhancement for interference measurement.

An initial solution may include measuring cross-link interference by a victim UE. As part of such, an interference UE can transmit uplink signals at multiple resources (e.g., SRS/physical uplink control channel (PUCCH)/physical uplink shared channel (PUSCH). In addition, a victim UE can calculate a CSI/L1-SINR based on an interference measured with respect to the same resources. Furthermore, to facilitate UE pairing, a gNB may configure multiple interference UEs, and a victim UE may report CSI/L1-SINR based on one or more UEs selected by the victim UE.

Figure 3:
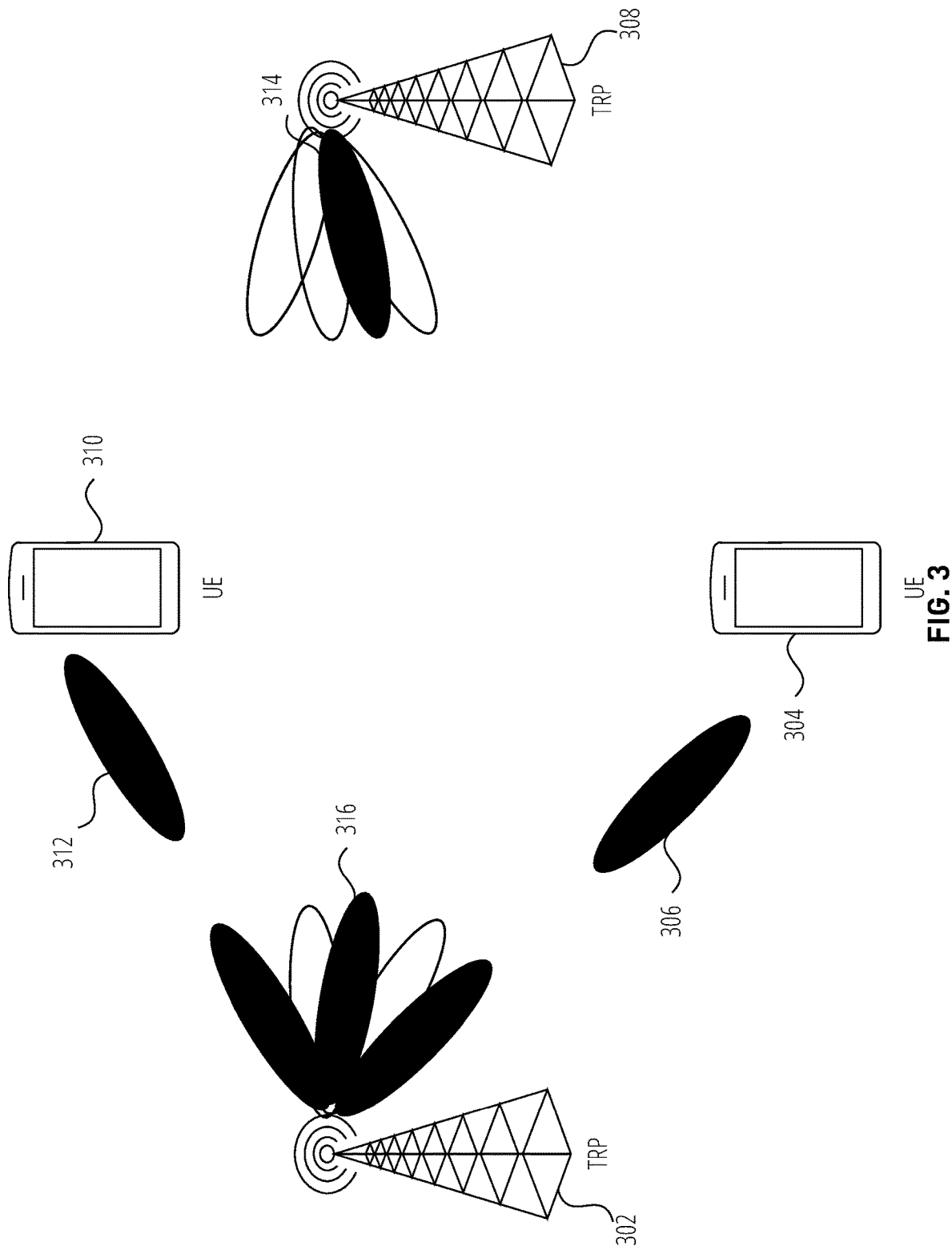
FIG. 3 illustrates an example wireless environment that may introduce cross-link interference in accordance with one embodiment.

FIG. 3 illustrates another example environment that may introduce cross-link interference (as well as various other types of interference). As illustrated, FIG. 3 includes a TRP 302 sending a channel measurement (panel 1) 306 to a victim UE 304 and receiving an uplink transmission 312 from an interfering UE 310, as well as a TRP 308 (i.e., an interference cell). In addition, the example environment of FIG. 3 may include a MU-MIMO interference measurement (panel 2) 316 at the TRP 302 and an inter cell interference 314 caused by the TRP 308. Notably, the signals illustrated in FIG. 3 (e.g., channel measurement (panel 1) 306, uplink transmission 312, and so forth) may be transmitted using TDM. Accordingly, such scenarios may include cross-link interference (caused by the UE 310), MU-MIMO interference, and inter-cell interference.

The CSI/L1-SINR enhancement to facilitate a cross-link interference measurement (e.g., the victim UE 104 measuring interference from the interference UE 106 as in FIG. 1, the victim UE 204 measuring interference from the interference UE 210 as in FIG. 2, and the victim UE 304 measuring interference from the interference UE 310) described above may include three options. In a first option, a gNB can configure a set of SRS resources for interference measurement in a CSI report configuration (CSI-reportConfig). In such embodiments, a UE may count interference measured from SRS resources. Optionally, a gNB can also configure a set of interference measurement resources (e.g., CSI-interference measurement (CSI-IM) and/or non-zero-power (NZP) CSI-reference signal (CSI-RS)) for other interference measurement, where each interference measurement resource (e.g., CSI-IM and/or NZP CSI-RS resource) is associated with one channel measurement resource. Notably, the CSI-IM resources may generally be used particularly for measuring inter-cell interference (as further shown in the scenario of FIG. 3) and the NZP CSI-RS resources may generally be used particularly for MU-MIMO interference measurements.

In addition, the first option for the CSI/L1-SINR enhancement to facilitate a cross-link interference measurement may include various sub-options, including: a. The SRS resources and channel measurement resource (CMR) may be one-to-one mapped (i.e., measuring one CSI based on one CMR, the victim UE can identify one SRS resource to measure the cross-link interference); or b. One CMR may be mapped to N SRS resources, wherein N is a positive integer. In addition, the following options may apply with respect to option b: i. The UE may calculate interference for the CSI/L1-SINR report from all SRS resources; or ii. The UE may calculate interference for the CSI/L1-SINR report based on M (M<N) of the N SRS resources, where the SRS resource indicator (SRI) can be reported by the UE. For instance, the UE may measure interference from all SRS resources and select one having the least interference to report, which can facilitate UE pairing in gNB scheduling. In another example, a value of M may be configured by higher layer signaling or DCI and a maximum value of M may be reported by the UE according to the UE's capabilities. In such embodiments, the value of N can be configured by higher layer signaling or downlink control information (DCI).

Regardless of whether option a or option b of the first option is used, the following may also apply: 1. A dedicated time domain restriction can be configured for the SRS, or a time domain restriction for interference can be applied for the SRS; and/or 2. The UE may measure the SRS and CMR with the same receive (Rx) beam (i.e., quasi co-location (QCL)-Type D). The following example may also apply with respect to the first option for the CSI/L1-SINR enhancement to facilitate a cross-link interference measurement:

```
CSI-ReportConfig ::=                    SEQUENCE {
    reportConfigId                          CSI-ReportConfigId,
    carrier                                 ServCellIndex
OPTIONAL, -- Need S
    resourcesForChannelMeasurement                  CSI-ResourceConfigId,
    csi-IM-ResourcesForInterference                 CSI-ResourceConfigId
OPTIONAL, -- Need R
    nzp-CSI-RS-ResourcesForInterference             CSI-ResourceConfigId
OPTIONAL, -- Need R
    srs-ResourcesForInterference            SRS-ResourceId    OPTIONAL, --
Need R
<unrelated omitted>
    timeRestrictionForChannelMeasurements           ENUMERATED {configured,
notConfigured},
    timeRestrictionForInterferenceMeasurements      ENUMERATED {configured,
notConfigured},
    timeRestrictionForSrsMeasurements               ENUMERATED {configured,
notConfigured},
    }
```

A second option for the CSI/L1-SINR enhancement to facilitate a cross-link interference measurement may include a gNB configuring additional CSI-IM resources for cross-link interference measurement in a CSI-reportConfig. An additional CSI-IM pattern may be introduced to align with a pattern for an SRS resource (e.g., a comb-2/comb-4/comb-8 based interleaved frequency division multiple access (IFDMA) pattern in one or more symbols). Alternatively, an additional CSI-IM pattern may be introduced to align with a pattern for PUSCH/PUCCH, wherein the CSI-IM may take consecutive subcarriers/symbol(s) in a bandwidth. Notably, such bandwidth may be configured by radio resource control (RRC) or dynamically changed by DCI.

In addition, the second option for the CSI/L1-SINR enhancement to facilitate a cross-link interference measurement may include various sub-options, including: a. The additional CSI-IM resources and channel measurement resource (CMR) being one-to-one mapped; or b. One CMR being mapped to N additional CSI-IM resources. Option b of the second option may have two additional options, including: i. A UE calculating interference for the CSI/L1-SINR report from all additional CSI-IM resources; or ii. A UE calculating interference for the CSI/L1-SINR report based on M (M<N) of the N SRS resources, wherein the CSI-IM resource indicator (CRI) can be reported by the UE. In such embodiments, the value of N can be configured by higher layer signaling or DCI.

Regardless of whether option a or option b of the second option is used, the following may also apply: 1. A dedicated time domain restriction can be configured for the additional CSI-IM, or a time domain restriction for interference can be applied for the additional CSI-IM; and/or 2. The UE may measure the CMR and additional CSI-IM with the same Rx beam (i.e., QCL-TypeD). The following may also apply with respect to the second option for the CSI/L1-SINR enhancement to facilitate a cross-link interference measurement:

```
CSI-ReportConfig ::=                        SEQUENCE {
    reportConfigId                              CSI-ReportConfigId,
    carrier                                     ServCellIndex
OPTIONAL, -- Need S
    resourcesForChannelMeasurement              CSI-ResourceConfigId,
    csi-IM-ResourcesForInterference             CSI-ResourceConfigId
OPTIONAL, -- Need R
    nzp-CSI-RS-ResourcesForInterference         CSI-ResourceConfigId
OPTIONAL, -- Need R
    csi-IM-ResourcesForInterference1            CSI-ResourceConfigId
OPTIONAL, -- Need R
<unrelated omitted>
    timeRestrictionForChannelMeasurements       ENUMERATED {configured,
notConfigured},
    timeRestrictionForInterferenceMeasurements  ENUMERATED {configured,
notConfigured},
    timeRestrictionForInterferenceMeasurements1 ENUMERATED {configured,
notConfigured},
    }
```

A third option for the CSI/L1-SINR enhancement to facilitate a cross-link interference measurement may include a gNB configuring additional NZP-CSI-RS resources for cross-link interference measurement in a CSI-reportConfig. An additional NZP-CSI-RS pattern may be introduced to align with a pattern for an SRS resource (e.g., a comb-2/comb-4/comb-8 based IFDMA pattern in one or more symbols), and the CSI-RS sequence can be generated based on the SRS sequence. Alternatively, an additional NZP-CSI-RS pattern may be introduced to align with a pattern for PUSCH/PUCCH, wherein the CSI-RS may take consecutive subcarriers/symbol(s) in a bandwidth. Notably, such bandwidth may be configured by RRC or dynamically changed by DCI.

In addition, the second option for the CSI/L1-SINR enhancement to facilitate a cross-link interference measurement may include various sub-options, including: a. The additional NZP-CSI-RS resources and channel measurement resource (CMR) being one-to-one mapped; or b. One CMR being mapped to N additional NZP-CSI-RS resources. Option b of the third option may have two additional options, including: i. A UE calculating interference for the CSI/L1-SINR report from all additional NZP-CSI-RS resources; or ii. A UE calculating interference for the CSI/L1-SINR report based on M (M<N) of the N NZP-CSI-RS resources, wherein the NZP-CSI-RS resource indicator (CRI) can be reported by the UE. In such embodiments, the value of N can be configured by higher layer signaling or DCI.

Regardless of whether option a or option b of the third option is used, the following may also apply: 1. A dedicated time domain restriction can be configured for the additional NZP-CSI-RS, or a time domain restriction for interference can be applied for the additional NZP-CSI-RS; and/or 2. The UE may measure the CMR and additional NZP-CSI-RS with the same Rx beam (i.e., QCL-TypeD). The following may also apply with respect to the third option for the CSI/L1-SINR enhancement to facilitate a cross-link interference measurement:

With respect to the second option and the third option for the CSI/L1-SINR enhancement to facilitate a cross-link interference measurement discussed above, if no additional pattern for CSI-IM/CSI-RS is introduced, a new SRS pattern can be introduced to align with the CSI-IM/CSI-RS pattern. In particular, with respect to the second option, a pattern for SRS can be introduced as defined for CSI-IM in 5.2.2.4 in 38.614. Similarly, with respect to the third option, a pattern for SRS can be introduced as defined for CSI-RS in 7.4.1.5.3 in 38.211. In such embodiments (i.e., with respect to the third option), the SRS sequence can be generated based on the CSI-RS sequence.

Furthermore, for CSI and/or L1-SINR measurements, the number of antenna ports for the SRS may be restricted to be no more than two. Accordingly, in some embodiments, the SRS may be configured with a single antenna port. In addition, the gNB may configure power control parameters for the SRS by higher layer signaling or DCI. The closed-loop transmit power control (TPC) command can be indicated by a unicast DCI signal or a group common DCI signal.

Figure 4:
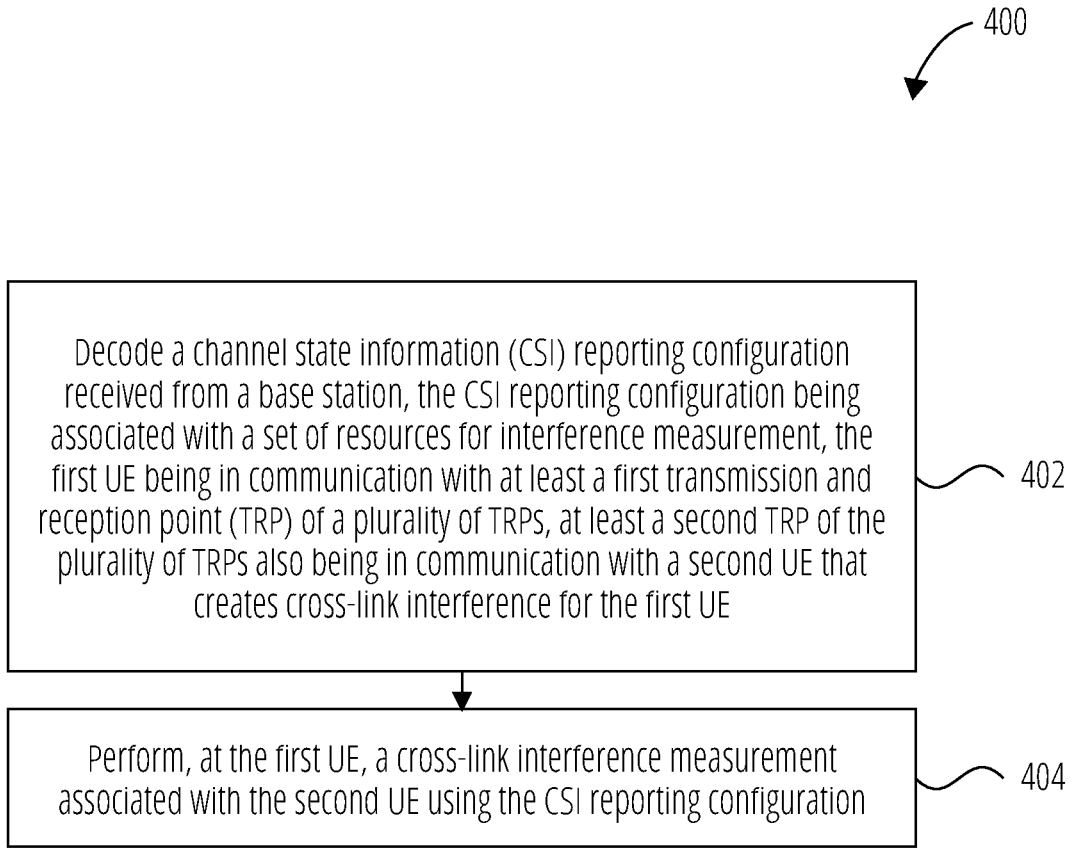
FIG. 4 illustrates a flowchart of a method for measuring cross-link interference in accordance with one embodiment.

FIG. 4 illustrates a flowchart of a method 400 for measuring cross-link interference at a victim UE. In block 402, the method 400 decodes a channel state information (CSI) reporting configuration received from a base station. The CSI reporting configuration may be associated with a set of resources for interference measurement. The first UE may be in communication with at least a first transmission and reception point (TRP) of a plurality of TRPs and at least a second TRP of the plurality of TRPs may also be in communication with a second UE that creates cross-link interference for the first UE. For instance, the UE 204 may be in communication the TRP 202 and the UE 210 may be in communication with the TRP 202, which may cause cross-link interference for the UE 204 (i.e., the victim UE) by the UE 210 (i.e., the interference UE). In block 404, the method 400 performs, at the first UE, a cross-link interference measurement associated with the second UE using the CSI reporting configuration. For example, the UE 204 may

```
CSI-ReportConfig ::=                         SEQUENCE {
   reportConfigId                               CSI-ReportConfigId,
   carrier                                      ServCellIndex
OPTIONAL, -- Need S
   resourcesForChannelMeasurement               CSI-ResourceConfigId,
   csi-IM-ResourcesForInterference              CSI-ResourceConfigId
OPTIONAL, -- Need R
   nzp-CSI-RS-ResourcesForInterference          CSI-ResourceConfigId
OPTIONAL, -- Need R
   nzp-CSI-RS-ResourcesForInterference1         CSI-ResourceConfigId
OPTIONAL, -- Need R
   <unrelated omitted>
   timeRestrictionForChannelMeasurements        ENUMERATED {configured,
notConfigured},
   timeRestrictionForInterferenceMeasurements   ENUMERATED {configured,
notConfigured},
   timeRestrictionForInterferenceMeasurements1  ENUMERATED {configured,
notConfigured},
   }
```

As briefly described above, an SRS enhancement solution is also provided herein. In particular, a new candidate value of usage can be introduced for an SRS resource set (e.g., interferenceMeas). Alternatively, one or more SRSs (e.g., SRS for codebook) can be reused for interference measurement. Notably, a beam (i.e., spatial relation or transmission configuration indicator (TCI)) for the SRS can be configured by RRC/medium access control control element (MAC CE) or indicated by DCI.

utilize configured resources for measuring the cross-link interference cause by the UE 210.

The method 400 may also include the first TRP and the second TRP being a same TRP. The method 400 may also include the set of resources for interference measurement comprising sounding reference signal (SRS) resources. The method 400 may also include the set of resources further including at least one of a CSI-interference measurement (CSI-IM) resource or a non-zero power (NZP) CSI-reference signal (CSI-RS) resource.

The method 400 may also include each of the SRS resources being mapped one-to-one to each of a set of channel measurement resources (CMRs) that are configured for the UE by the base station. The method 400 may further include at least one of the CMRs being mapped to more than one SRS resource. The method 400 may further include the UE measuring at least one SRS resource and at least one CMR using a same receive (Rx) beam.

The method 400 may further include the set of resources for interference measurement comprising CSI-IM resources. The method 400 may further include a pattern of the CSI-IM resources aligning with a pattern of an SRS resource. The method 400 may also include each of the CSI-IM resources being mapped one-to-one to each of a set of channel measurement resources (CMRs) that are configured for the UE by the base station.

The method 400 may further include at least one of the CMRs being mapped to more than one CSI-IM resource. The method 400 may also include the set of resources for interference measurement comprising non-zero power (NZP) CSI-reference signal (CSI-RS) resources. The method 400 may further include a pattern of the NZP CSI-RS resources aligning with a pattern of an SRS resource and a sequence of the CSI-RS being generated based on a sequence of the SRS. The method 400 may further include each of the NZP CSI-RS resources being mapped one-to-one to each of a set of channel measurement resources (CMRs) that are configured for the UE by the base station.

The method 400 may further include at least one of the CMRs being mapped to more than one NZP CSI-RS resource. The method 400 may also include the set of resources for interference measurement comprising at least one of sounding reference signal (SRS) resources, CSI-interference measurement (CSI-IM) resources, or non-zero power (NZP) CSI-reference signal (CSI-RS) resources. The method 400 may further include, when the set of resources for interference measurement comprise CSI-IM resources or NZP CSI-RS resources, a pattern of the CSI-IM resources or the NZP CSI-RS resources aligning with a pattern of a physical uplink shared channel (PUSCH) and a physical uplink control channel (PUCCH).

Embodiments contemplated herein include an apparatus comprising means to perform one or more elements of the method 400. This apparatus may be, for example, an apparatus of a UE (such as a wireless device 602 that is a UE, as described herein).

Embodiments contemplated herein include one or more non-transitory computer-readable media comprising instructions to cause an electronic device, upon execution of the instructions by one or more processors of the electronic device, to perform one or more elements of the method 400. This non-transitory computer-readable media may be, for example, a memory of a UE (such as a memory 606 of a wireless device 602 that is a UE, as described herein).

Embodiments contemplated herein include an apparatus comprising logic, modules, or circuitry to perform one or more elements of the method 400. This apparatus may be, for example, an apparatus of a UE (such as a wireless device 602 that is a UE, as described herein).

Embodiments contemplated herein include an apparatus comprising: one or more processors and one or more computer-readable media comprising instructions that, when executed by the one or more processors, cause the one or more processors to perform one or more elements of the method 400. This apparatus may be, for example, an apparatus of a UE (such as a wireless device 602 that is a UE, as described herein).

Embodiments contemplated herein include a signal as described in or related to one or more elements of the method 400.

Embodiments contemplated herein include a computer program or computer program product comprising instructions, wherein execution of the program by a processor is to cause the processor to carry out one or more elements of the method 400. The processor may be a processor of a UE (such as a processor(s) 604 of a wireless device 602 that is a UE, as described herein). These instructions may be, for example, located in the processor and/or on a memory of the UE (such as a memory 606 of a wireless device 602 that is a UE, as described herein).

Figure 5:
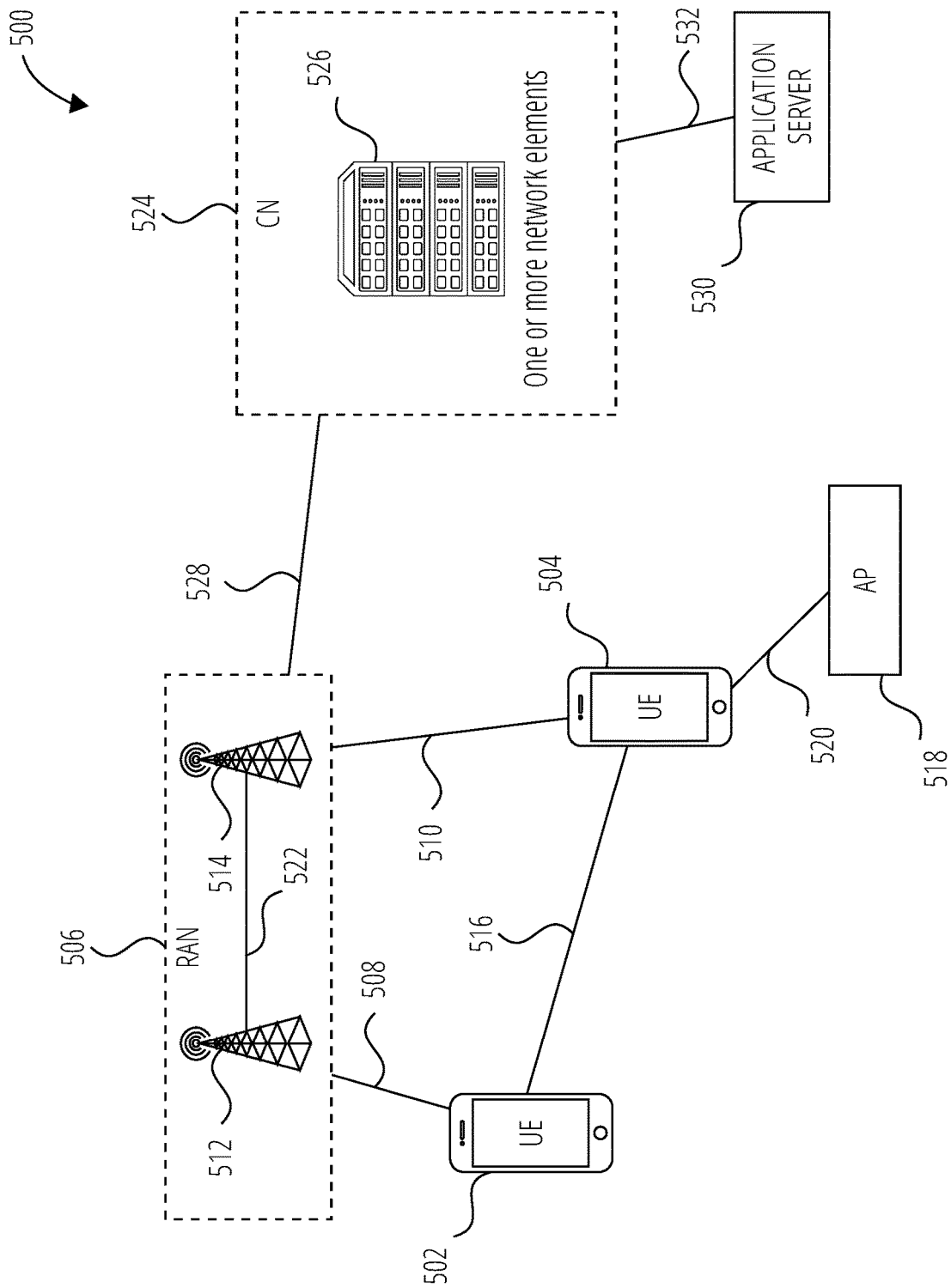
FIG. 5 illustrates an example architecture of a wireless communication system, according to embodiments disclosed herein.

FIG. 5 illustrates an example architecture of a wireless communication system 500, according to embodiments disclosed herein. The following description is provided for an example wireless communication system 500 that operates in conjunction with the LTE system standards and/or 5G or NR system standards as provided by 3GPP technical specifications.

As shown by FIG. 5, the wireless communication system 500 includes UE 502 and UE 504 (although any number of UEs may be used). In this example, the UE 502 and the UE 504 are illustrated as smartphones (e.g., handheld touch-screen mobile computing devices connectable to one or more cellular networks), but may also comprise any mobile or non-mobile computing device configured for wireless communication.

The UE 502 and UE 504 may be configured to communicatively couple with a RAN 506. In embodiments, the RAN 506 may be NG-RAN, E-UTRAN, etc. The UE 502 and UE 504 utilize connections (or channels) (shown as connection 508 and connection 510, respectively) with the RAN 506, each of which comprises a physical communications interface. The RAN 506 can include one or more base stations, such as base station 512 and base station 514, that enable the connection 508 and connection 510.

In this example, the connection 508 and connection 510 are air interfaces to enable such communicative coupling, and may be consistent with RAT(s) used by the RAN 506, such as, for example, an LTE and/or NR.

In some embodiments, the UE 502 and UE 504 may also directly exchange communication data via a sidelink interface 516. The UE 504 is shown to be configured to access an access point (shown as AP 518) via connection 520. By way of example, the connection 520 can comprise a local wireless connection, such as a connection consistent with any IEEE 802.11 protocol, wherein the AP 518 may comprise a Wi-Fi® router. In this example, the AP 518 may be connected to another network (for example, the Internet) without going through a CN 524.

In embodiments, the UE 502 and UE 504 can be configured to communicate using orthogonal frequency division multiplexing (OFDM) communication signals with each other or with the base station 512 and/or the base station 514 over a multicarrier communication channel in accordance with various communication techniques, such as, but not limited to, an orthogonal frequency division multiple access (OFDMA) communication technique (e.g., for downlink communications) or a single carrier frequency division multiple access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, all or parts of the base station 512 or base station 514 may be implemented as one or more software entities running on server computers as part of a virtual network. In addition, or in other embodiments, the base station 512 or base station 514 may be configured to communicate with one another via interface 522. In embodiments where the wireless communication system 500 is an LTE system (e.g., when the CN 524 is an EPC), the interface 522 may be an X2 interface. The X2 interface may be defined between two or more base stations (e.g., two or more eNBs and the like) that connect to an EPC, and/or between two eNBs connecting to the EPC. In embodiments where the wireless communication system 500 is an NR system (e.g., when CN 524 is a 5GC), the interface 522 may be an Xn interface. The Xn interface is defined between two or more base stations (e.g., two or more gNBs and the like) that connect to 5GC, between a base station 512 (e.g., a gNB) connecting to 5GC and an eNB, and/or between two eNBs connecting to 5GC (e.g., CN 524).

The RAN 506 is shown to be communicatively coupled to the CN 524. The CN 524 may comprise one or more network elements 526, which are configured to offer various data and telecommunications services to customers/subscribers (e.g., users of UE 502 and UE 504) who are connected to the CN 524 via the RAN 506. The components of the CN 524 may be implemented in one physical device or separate physical devices including components to read and execute instructions from a machine-readable or computer-readable medium (e.g., a non-transitory machine-readable storage medium).

In embodiments, the CN 524 may be an EPC, and the RAN 506 may be connected with the CN 524 via an S1 interface 528. In embodiments, the S1 interface 528 may be split into two parts, an S1 user plane (S1-U) interface, which carries traffic data between the base station 512 or base station 514 and a serving gateway (S-GW), and the S1-MME interface, which is a signaling interface between the base station 512 or base station 514 and mobility management entities (MMEs).

In embodiments, the CN 524 may be a 5GC, and the RAN 506 may be connected with the CN 524 via an NG interface 528. In embodiments, the NG interface 528 may be split into two parts, an NG user plane (NG-U) interface, which carries traffic data between the base station 512 or base station 514 and a user plane function (UPF), and the S1 control plane (NG-C) interface, which is a signaling interface between the base station 512 or base station 514 and access and mobility management functions (AMFs).

Generally, an application server 530 may be an element offering applications that use internet protocol (IP) bearer resources with the CN 524 (e.g., packet switched data services). The application server 530 can also be configured to support one or more communication services (e.g., VoIP sessions, group communication sessions, etc.) for the UE 502 and UE 504 via the CN 524. The application server 530 may communicate with the CN 524 through an IP communications interface 532.

Figure 6:
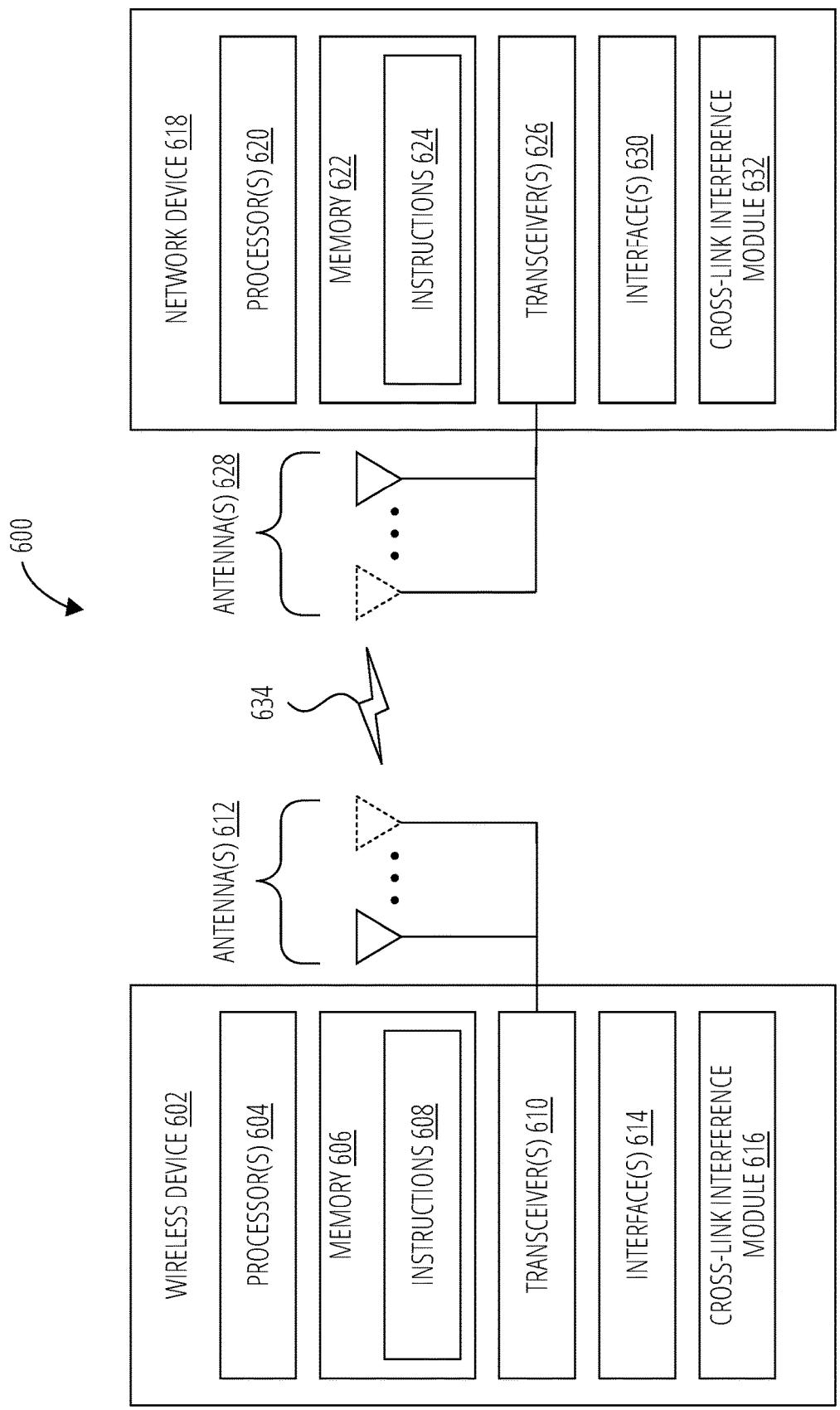
FIG. 6 illustrates a system for performing signaling between a wireless device and a network device, according to embodiments disclosed herein.

FIG. 6 illustrates a system 600 for performing signaling 634 between a wireless device 602 and a network device 618, according to embodiments disclosed herein. The system 600 may be a portion of a wireless communications system as herein described. The wireless device 602 may be, for example, a UE of a wireless communication system. The network device 618 may be, for example, a base station (e.g., an eNB or a gNB) of a wireless communication system.

The wireless device 602 may include one or more processor(s) 604. The processor(s) 604 may execute instructions such that various operations of the wireless device 602 are performed, as described herein. The processor(s) 604 may include one or more baseband processors implemented using, for example, a central processing unit (CPU), a digital signal processor (DSP), an application specific integrated circuit (ASIC), a controller, a field programmable gate array (FPGA) device, another hardware device, a firmware device, or any combination thereof configured to perform the operations described herein.

The wireless device 602 may include a memory 606. The memory 606 may be a non-transitory computer-readable storage medium that stores instructions 608 (which may include, for example, the instructions being executed by the processor(s) 604). The instructions 608 may also be referred to as program code or a computer program. The memory 606 may also store data used by, and results computed by, the processor(s) 604.

The wireless device 602 may include one or more transceiver(s) 610 that may include radio frequency (RF) transmitter and/or receiver circuitry that use the antenna(s) 612 of the wireless device 602 to facilitate signaling (e.g., the signaling 634) to and/or from the wireless device 602 with other devices (e.g., the network device 618) according to corresponding RATs.

The wireless device 602 may include one or more antenna(s) 612 (e.g., one, two, four, or more). For embodiments with multiple antenna(s) 612, the wireless device 602 may leverage the spatial diversity of such multiple antenna(s) 612 to send and/or receive multiple different data streams on the same time and frequency resources. This behavior may be referred to as, for example, multiple input multiple output (MIMO) behavior (referring to the multiple antennas used at each of a transmitting device and a receiving device that enable this aspect). MIMO transmissions by the wireless device 602 may be accomplished according to precoding (or digital beamforming) that is applied at the wireless device 602 that multiplexes the data streams across the antenna(s) 612 according to known or assumed channel characteristics such that each data stream is received with an appropriate signal strength relative to other streams and at a desired location in the spatial domain (e.g., the location of a receiver associated with that data stream). Certain embodiments may use single user MIMO (SU-MIMO) methods (where the data streams are all directed to a single receiver) and/or multi user MIMO (MU-MIMO) methods (where individual data streams may be directed to individual (different) receivers in different locations in the spatial domain).

In certain embodiments having multiple antennas, the wireless device 602 may implement analog beamforming techniques, whereby phases of the signals sent by the antenna(s) 612 are relatively adjusted such that the (joint) transmission of the antenna(s) 612 can be directed (this is sometimes referred to as beam steering).

The wireless device 602 may include one or more interface(s) 614. The interface(s) 614 may be used to provide input to or output from the wireless device 602. For example, a wireless device 602 that is a UE may include interface(s) 614 such as microphones, speakers, a touchscreen, buttons, and the like in order to allow for input and/or output to the UE by a user of the UE. Other interfaces of such a UE may be made up of transmitters, receivers, and other circuitry (e.g., other than the transceiver (s) 610/ antenna(s) 612 already described) that allow for communication between the UE and other devices and may operate according to known protocols (e.g., Wi-Fi®, Bluetooth®, and the like).

The wireless device 602 may include a cross-link interference module 616. The cross-link interference module 616 may be implemented via hardware, software, or combinations thereof. For example, the cross-link interference module 616 may be implemented as a processor, circuit, and/or instructions 608 stored in the memory 606 and executed by the processor(s) 604. In some examples, the cross-link interference module 616 may be integrated within the processor(s) 604 and/or the transceiver(s) 610. For example, the cross-link interference module 616 may be implemented by a combination of software components (e.g., executed by a DSP or a general processor) and hardware components (e.g., logic gates and circuitry) within the processor(s) 604 or the transceiver(s) 610.

The cross-link interference module 616 may be used for various aspects of the present disclosure, for example, aspects of FIGS. 1-4. The cross-link interference module 616 is configured to assist in measuring cross-link interference in a wireless environment.

The network device 618 may include one or more processor(s) 620. The processor(s) 620 may execute instructions such that various operations of the network device 618 are performed, as described herein. The processor(s) 604 may include one or more baseband processors implemented using, for example, a CPU, a DSP, an ASIC, a controller, an FPGA device, another hardware device, a firmware device, or any combination thereof configured to perform the operations described herein.

The network device 618 may include a memory 622. The memory 622 may be a non-transitory computer-readable storage medium that stores instructions 624 (which may include, for example, the instructions being executed by the processor(s) 620). The instructions 624 may also be referred to as program code or a computer program. The memory 622 may also store data used by, and results computed by, the processor(s) 620.

The network device 618 may include one or more transceiver(s) 626 that may include RF transmitter and/or receiver circuitry that use the antenna(s) 628 of the network device 618 to facilitate signaling (e.g., the signaling 634) to and/or from the network device 618 with other devices (e.g., the wireless device 602) according to corresponding RATs.

The network device 618 may include one or more antenna(s) 628 (e.g., one, two, four, or more). In embodiments having multiple antenna(s) 628, the network device 618 may perform MIMO, digital beamforming, analog beamforming, beam steering, etc., as has been described.

The network device 618 may include one or more interface(s) 630. The interface(s) 630 may be used to provide input to or output from the network device 618. For example, a network device 618 that is a base station may include interface(s) 630 made up of transmitters, receivers, and other circuitry (e.g., other than the transceiver(s) 626/antenna(s) 628 already described) that enables the base station to communicate with other equipment in a core network, and/or that enables the base station to communicate with external networks, computers, databases, and the like for purposes of operations, administration, and maintenance of the base station or other equipment operably connected thereto.

The network device 618 may include a cross-link interference module 632. The cross-link interference module 632 may be implemented via hardware, software, or combinations thereof. For example, the cross-link interference module 632 may be implemented as a processor, circuit, and/or instructions 624 stored in the memory 622 and executed by the processor(s) 620. In some examples, the cross-link interference module 632 may be integrated within the processor(s) 620 and/or the transceiver(s) 626. For example, the cross-link interference module 632 may be implemented by a combination of software components (e.g., executed by a DSP or a general processor) and hardware components (e.g., logic gates and circuitry) within the processor(s) 620 or the transceiver(s) 626.

The cross-link interference module 632 may be used for various aspects of the present disclosure, for example, aspects of FIGS. 1-4. The cross-link interference module 632 is configured to assist in providing resources for measuring cross-link interference in a wireless environment.

For one or more embodiments, at least one of the components set forth in one or more of the preceding figures may be configured to perform one or more operations, techniques, processes, and/or methods as set forth herein. For example, a baseband processor as described herein in connection with one or more of the preceding figures may be configured to operate in accordance with one or more of the examples set forth herein. For another example, circuitry associated with a UE, base station, network element, etc. as described above in connection with one or more of the preceding figures may be configured to operate in accordance with one or more of the examples set forth herein.

Any of the above described embodiments may be combined with any other embodiment (or combination of embodiments), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A user equipment (UE) comprising:
a processor; and
a memory storing instructions that, when executed by the processor, configure the processor to:
decode a channel state information (CSI) reporting configuration received from a base station, the CSI reporting configuration being associated with a set of resources for interference measurement, a first UE being in communication with at least a first transmission and reception point (TRP) of a plurality of TRPs, at least a second TRP of the plurality of TRPs also being in communication with a second UE that creates cross-link interference for the first UE, wherein the set of resources for interference measurement comprise sounding reference signal (SRS) resources, and wherein the set of resources further include at least one of a CSI-interference measurement (CSI-IM) resource or a non-zero power (NZP) CSI-reference signal (CSI-RS) resource; and
perform, at the first UE, a cross-link interference measurement associated with the second UE using the CSI reporting configuration.

2. The UE of claim 1, wherein the first TRP and the second TRP are a same TRP.

3. The UE of claim 1, wherein each of the SRS resources are mapped one-to-one to each of a set of channel measurement resources (CMRs) that are configured for the UE by the base station.

4. The UE of claim 3, wherein at least one of the CMRs is mapped to more than one SRS resource.

5. The UE of claim 3, wherein the UE measures at least one SRS resource and at least one CMR using a same receive (Rx) beam.

6. The UE of claim 1, wherein the set of resources for interference measurement comprise CSI-IM resources.

7. The UE of claim 6, wherein a pattern of the CSI-IM resources aligns with a pattern of an SRS resource.

8. The UE of claim 6, wherein each of the CSI-IM resources are mapped one-to-one to each of a set of channel measurement resources (CMRs) that are configured for the UE by the base station.

9. The UE of claim 8, wherein at least one of the CMRs is mapped to more than one CSI-IM resource.

10. The UE of claim 1, wherein the set of resources for interference measurement comprise NZP CSI-RS resources.

11. The UE of claim 10, wherein a pattern of the NZP CSI-RS resources aligns with a pattern of an SRS resource and a sequence of the CSI-RS is generated based on a sequence of the SRS.

12. The UE of claim 10, wherein each of the NZP CSI-RS resources are mapped one-to-one to each of a set of channel measurement resources (CMRs) that are configured for the UE by the base station.

13. The UE of claim 12, wherein at least one of the CMRs is mapped to more than one NZP CSI-RS resource.

14. A method at a first user equipment (UE) for interference measurement, the method comprising:
decoding a channel state information (CSI) reporting configuration received from a base station, the CSI reporting configuration being associated with a set of resources for interference measurement, a first UE being in communication with at least a first transmission and reception point (TRP) of a plurality of TRPs, at least a second TRP of the plurality of TRPs also being in communication with a second UE that creates cross-link interference for the first UE, wherein when the set of resources for interference measurement comprise CSI-interference measurement (CSI-IM) resources or non-zero power (NZP) CSI-reference signal (CSI-RS) resources, a pattern of the CSI-IM resources or the NZP CSI-RS resources align with a pattern of a physical uplink shared channel (PUSCH) and a physical uplink control channel (PUCCH); and
performing, at the first UE, a cross-link interference measurement associated with the second UE using the CSI reporting configuration.

15. The method of claim 14, wherein the set of resources for interference measurement comprise at least one of sounding reference signal (SRS) resources, CSI-IM resources, or NZP CSI-RS resources.

16. A non-transitory computer-readable storage medium, the computer-readable storage medium including instructions that when executed by a processor of a user equipment, cause the processor to:
decode a channel state information (CSI) reporting configuration received from a base station, the CSI reporting configuration being associated with a set of resources for interference measurement, a first UE being in communication with at least a first transmission and reception point (TRP) of a plurality of TRPs, at least a second TRP of the plurality of TRPs also being in communication with a second UE that creates cross-link interference for the first UE, wherein when the set of resources for interference measurement comprise CSI-interference measurement (CSI-IM) resources or non-zero power (NZP) CSI-reference signal (CSI-RS) resources, a pattern of the CSI-IM resources or the NZP CSI-RS resources align with a pattern of a physical uplink shared channel (PUSCH) and a physical uplink control channel (PUCCH); and
perform, at the first UE, a cross-link interference measurement associated with the second UE using the CSI reporting configuration.

17. The non-transitory computer-readable storage medium of claim 16, wherein the set of resources for interference measurement comprise at least one of sounding reference signal (SRS) resources, CSI-IM resources, or NZP CSI-RS resources.

* * * * *